(12) United States Patent
Kaku

(10) Patent No.: US 11,258,634 B2
(45) Date of Patent: Feb. 22, 2022

(54) ELECTRONIC CONTROL UNIT

(71) Applicant: DENSO CORPORATION, Kariya (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 16/748,994

(22) Filed: Jan. 22, 2020

(65) Prior Publication Data
US 2020/0274736 A1    Aug. 27, 2020

(30) Foreign Application Priority Data

Feb. 22, 2019   (JP) .............................. JP2019-030739

(51) Int. Cl.
| H04L 12/437 | (2006.01) |
| H04L 12/54 | (2013.01) |
| H04B 7/155 | (2006.01) |
| H04L 12/26 | (2006.01) |
| H04L 12/24 | (2006.01) |
| H04L 12/40 | (2006.01) |
| H04L 12/70 | (2013.01) |
| H04L 41/0663 | (2022.01) |
| H04L 43/0823 | (2022.01) |

(52) U.S. Cl.
CPC ......... *H04L 12/437* (2013.01); *H04B 7/1555* (2013.01); *H04L 12/40013* (2013.01); *H04L 12/5601* (2013.01); *H04L 41/0663* (2013.01); *H04L 43/0847* (2013.01); *H04L 2012/40215* (2013.01); *H04L 2012/40273* (2013.01); *H04L 2012/5612* (2013.01)

(58) Field of Classification Search
CPC .............. H04L 12/437; H04L 12/5601; H04L 12/40013; H04L 43/0847; H04L 2012/40273; H04L 2012/40215; H04L 2012/5612; H04L 41/0663; H04B 7/1555
See application file for complete search history.

(56) References Cited

U.S. PATENT DOCUMENTS

| 7,359,637 B2 * | 4/2008 | Kim .................... | H04J 14/0282 398/72 |
| 8,041,747 B2 * | 10/2011 | Nishihashi .............. | H04L 45/60 707/802 |

(Continued)

FOREIGN PATENT DOCUMENTS

JP    H9-247185 A    9/1997

*Primary Examiner* — Rasheed Gidado
(74) *Attorney, Agent, or Firm* — Posz Law Group, PLC

(57) ABSTRACT

An electronic control unit includes a relay device that is connected via a first network with a different relay device included in a different electronic control unit to relay a frame via the first network. It is determined whether a reception interruption has occurred. The reception interruption signifies that at least one predetermined frame scheduled to be transmitted from the different relay device is not received within a predetermined time via the first network. In response to the reception interruption being determined to have occurred, it is determined whether an abnormality has occurred in the first network based on at least one of (i) a presence or absence of reception of a state data representing a state of the different electronic control unit from the different electronic control unit via a second network within a fixed time, and (ii) a content of the state data.

16 Claims, 4 Drawing Sheets

(56) References Cited

U.S. PATENT DOCUMENTS

| | | | |
|---|---|---|---|
| 9,503,920 B2* | 11/2016 | Someya | H04W 24/04 |
| 9,906,377 B2* | 2/2018 | Kaku | H04L 12/437 |
| 10,046,801 B2* | 8/2018 | Niki | G06K 9/00798 |
| 2015/0256649 A1* | 9/2015 | Nishi | H04L 67/10 |
| | | | 709/203 |
| 2017/0041161 A1 | 2/2017 | Kaku | |
| 2018/0176305 A1* | 6/2018 | Omori | H04L 67/125 |
| 2018/0203685 A1* | 7/2018 | Nakamura | H04L 67/12 |
| 2019/0273755 A1* | 9/2019 | Atsumi | H04W 4/48 |

* cited by examiner

ELECTRONIC CONTROL UNIT

CROSS REFERENCE RELATED APPLICATION

The present application claims the benefit of priority from Japanese Patent Application No. 2019-030739 filed on Feb. 22, 2019. The entire disclosure of the above application is incorporated herein by reference.

TECHNICAL FIELD

The present disclosure relates to an electronic control unit including a relay device.

BACKGROUND

For example, in a communication network of Ethernet, a ring type topology is formed by switches serving as a plurality of relay devices connected in a ring shape. "Ethernet" is a registered trademark. In the ring type topology, a ring-shaped communication path capable of making one round of a frame is configured by a plurality of switches and communication lines as a network connecting the switches.

Further, there is known a configuration which connects, in a ring shape, switches serving as relay devices provided respectively in a plurality of ECUs (Electronic Control Units).

SUMMARY

According to an example of the present disclosure, an electronic control unit is provided to include a relay device.

The relay device is connected via a first network with a different relay device included in a different electronic control unit to relay a frame via the first network. It is determined whether a reception interruption has occurred. The reception interruption signifies that at least one predetermined frame scheduled to be transmitted from the different relay device is not received within a predetermined time via the first network. In response to the reception interruption being determined to have occurred, it is determined whether an abnormality has occurred in the first network based on at least one of (i) a presence or absence of reception of a state data representing a state of the different electronic control unit from the different electronic control unit via a second network within a fixed time, and (ii) a content of the state data.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

[1. Configuration]

Figure 1:
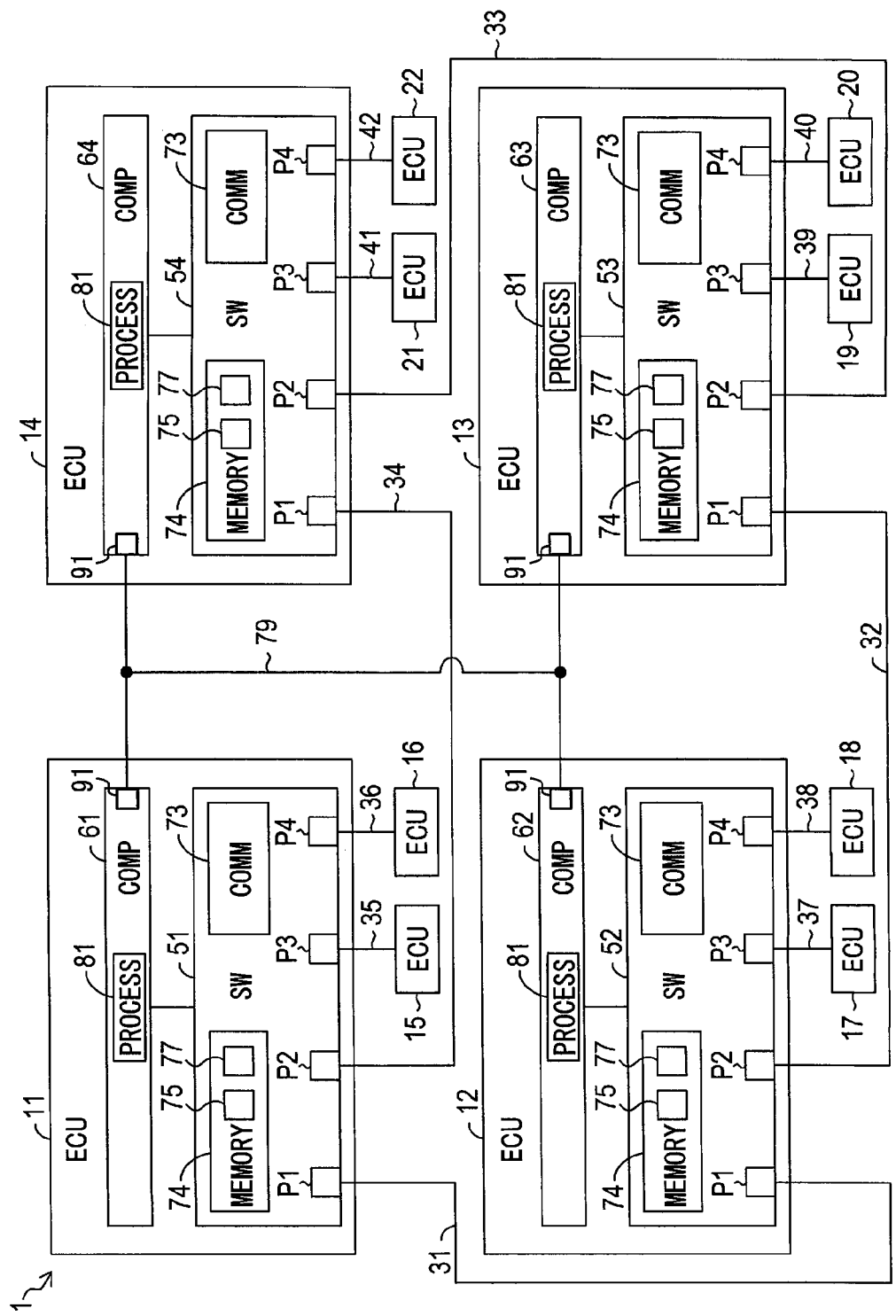
FIG. 1 is a configuration diagram illustrating a configuration of an in-vehicle communication system according to an embodiment.

An in-vehicle communication system 1 according to a present embodiment shown in FIG. 1 includes ECUs 11 to 22 and communication lines 31 to 42 mounted on a vehicle.

Each of the ECUs 11 to 14 includes (i) a switch 51 to 54, (ii) a plurality of ports P1 to P4, (iii) a communication control circuit 73 as an Ethernet controller or a first controller, (iv) a computation circuit as a CAN controller or a second controller, and (iv) a bus interface 91 connected with a communication bus 79. Here, "controller" may be also referred to as "control circuit" or "processor".

Note that the first controller and the second controller may be provided not only to be separate from each other but also to be integrated to each other; further, each or one of the first controller and the second controller may be provided as more than one controller. Thus, the first controller and the second controller may be provided as one or more controllers. Each controller may provide a plurality of functions, while each controller may include a plurality of modules to provide the respective functions. Here, "module" may be also referred to as "section".

Further, an individual module in a controller or an individual controller may be configured by (i) a central processing unit (CPU) along with memory storing instructions executed by the CPU or (ii) hardware circuitry such as an integrated circuit or hard-wired logic circuit with no CPU, or (iii) a combination of the CPU along with memory and the hardware circuitry.

As an example of the present embodiment, as shown in FIG. 1, the switch 51 to 54 in the ECU 11 to 14 is provided as including the plurality of ports P1 to P4. In contrast, the switch 51 to 54 and the plurality of ports P1 to P4 may be provided to be separate from each other. The switches 51 to 54 are provided as Ethernet switches 51 to 54 (i.e., network switches for Ethernet) which perform relay communication with ECUs 15 to 22 other than the ECUs 11 to 14.

Further, as an example of the present embodiment, the computation circuit as the second controller and the bus interface 91 are provided as being included in each of microcomputers 61 to 64. Although not illustrated, the microcomputers 61 to 64 each further include a CPU, a ROM, a RAM, and the like. In the ECU 11 to 14, the microcomputer 61 to 64 and the switch 51 to 54 are connected via a communication link.

The switches 51 to 54 are, for example, layer 2 switches (i.e., L2 switches), and perform communication for relaying according to the Ethernet standard. Each of the switches 51 to 54 includes the plurality of ports P1 to P4 for transmitting and receiving a frame. As an example of the present embodiment, each of the switches 51 to 54 further includes the communication control circuit 73 as the first controller that performs each process including a relay process according to the Ethernet standard. Note that the number of ports of each of the switches 51 to 54 is four in this example, but may be other than four. As an example, the communication control circuit 73 (i.e., first controller) may be configured by (i) an integrated circuit, or (ii) a microcomputer, or (iii) a combination of the integrated circuit and the microcomputer. The operations of the switches 51 to 54 are realized by the communication control circuit 73.

In the in-vehicle communication system 1, the port P1 of the switch 51 of the ECU 11 and the port P1 of the switch 52 of the ECU 12 are connected by a communication line 31. The port P2 of the switch 52 of the ECU 12 and the port P1 of the switch 53 of the ECU 13 are connected by a communication line 32. Further, the port P2 of the switch 53 of the ECU 13 and the port P2 of the switch 54 of the ECU 14 are connected by a communication line 33. The port P1 of the switch 54 of the ECU 14 and the port P2 of the switch 51 of the ECU 11 are connected by a communication line 34.

In other words, the switches 51 to 54 are connected in a ring shape by the port P1 or the port P2 of one switch connected to the port P1 or the port P2 of another switch (i.e., a different one switch or different switch). For this reason, the switches 51 to 54 and the communication lines 31 to 34 that connect the switches 51 to 54 form a ring-shaped communication path that allows a frame to circulate. The ring shape may be also referred to as a loop shape.

The ECUs 15 and 16 are connected to the ports P3 and P4 of the switch 51 of the ECU 11 via the communication lines 35 and 36, respectively. The ECUs 17 and 18 are connected to the ports P3 and P4 of the switch 52 of the ECU 12 via the communication lines 37 and 38, respectively. The ECUs 19 and 20 are connected to the ports P3 and P4 of the switch 53 of the ECU 13 via the communication lines 39 and 40, respectively. The ECUs 21 and 22 are connected to the ports P3 and P4 of the switch 54 of the ECU 14 via the communication lines 41 and 42, respectively. That is, the ECUs 15 to 22 as communication nodes (that is, communication terminals) are connected to the ports P3 and P4 that are not used for ring connection, among the ports P1 to P4 of the switches 51 to 54.

The communication paths include a counterclockwise communication path in a counterclockwise direction, and a clockwise communication path in a clockwise direction. For instance, if starting from the switch 51, the counterclockwise communication path is going to the switch 52 and then going to the switches 53 and 54, whereas the clockwise communication path is going to the switch 54 and then going to the switches 53 and 52. Further, such two communication paths can also function or be used for a one of the ECUs 15 to 22 (directly) connected with a corresponding one of the switches 51 to 54 to communicate with a different one of the ECUs 15 to 22 (directly) connected to a corresponding one of the switches 51 to 54. For instance, two communication paths can also function or be used for the ECU 15 or ECU 16 directly connected to the switch 51 to communicate with one of the ECUs 17 to 22 (directly) connected to a corresponding one of the switch 52 to 54.

In the following description, among the ports P1 to P4, the ports P1 and P2 used for ring connection are also referred to as ring ports. Ports that are not ring ports, that is, ports P3 and P4 that are not used for ring connection are also referred to as common ports.

Frames communicated between the ports P1 to P4 of the switches 51 to 54 are Ethernet frames. This Ethernet frame includes a destination MAC address and a source MAC address in addition to a data as a transmission target. The destination MAC address is the MAC address of a frame destination device. The source MAC address is the MAC address of a frame source device. The MAC address corresponds to a device address.

Each switch 51 to 54 includes a memory 74. The memory 74 may be, for example, a volatile memory or a rewritable nonvolatile memory. The memory 74 stores at least a MAC address table 75 and a switch ID table 77.

In the MAC address table 75 of each switch of the switches 51 to 54, the MAC address of any device connected with each switch via a port is registered for the port in each switch. In other words, in the MAC address table 75 of a first switch, the MAC address of any device connected with the first switch via a first port of the ports P1 to P4 of the first switch is registered for the first port in the first switch. For example, in the MAC address table 75 of the switch 51, the MAC address of the ECU 15 is registered for the common port P3; the MAC address of the ECU 16 is registered for the common port P4. For each of the ring ports P1 and P2 of one of the switches 52 to 54, the MAC addresses of the ECUs 17 to 22 connected to the common ports P3 and P4 of the other one (i.e., different one) of the switches 52 to 54 are registered. This is because the ECUs 17 to 22 are connected with the ring ports P1 and P2 of the switch 51 via other switches 52 to 54. Registration of the MAC address in the MAC address table 75 is performed by a MAC address learning function provided in the switches 51 to 54, for example.

Each of the switches 51 to 54 performs, for example, following processing as a relay process in Ethernet. Each of the switches 51 to 54 receives a frame from any of the ports P1 to P4. Based on the destination MAC address in the received frame (hereinafter referred to as "received frame") and the MAC address table 75, the port of the transfer destination of the received frame is determined. Then, the received frame is transmitted from the port determined as the transfer destination.

For example, suppose that the ECU 15 connected to the port P3 of the switch 51 transmits a frame addressed to the ECU 19 connected to the port P3 of the switch 53. Note that the frame having the ECU 19 as the destination is a frame including the MAC address of the ECU 19 as the destination MAC address. Further, the frame transmitted from the ECU 15 includes the MAC address of the ECU 15 as the transmission source MAC address. Here, the frame addressed to the ECU 19 transmitted from the ECU 15 is referred to as a frame f15-19.

In this case, the switch 51 receives the frame f15-19 from the port P3. If the switch 51 transmits the received frame f15-19 from the port P1 of the ports P1 and P2, the frame f15-19 is input to the port P1 of the switch 53 via the switch 52. Then, the frame f15-10 is transferred from the port P3 of the switch 53 to the ECU 19.

Although not shown, the switches 51 to 54 include a nonvolatile memory; the ID (that is, Identification) of the switch is stored in the nonvolatile memory. The ID of the switch corresponds to identification information for identifying the switch.

As described above, the memory 74 of each of the switches 51 to 54 stores or records the switch ID table 77. In the switch ID table 77, the IDs of the other switches connected in a ring shape are recorded to be associated with the connection order of the other switches as viewed from at least one of the ports P1 and P2 of the switch. That is, the switch ID table 77 of a first switch of any one of the switches 51 to 54 records the information or contents indicating the relation between the IDs of the other switches and the connection order of the other switches when viewed from each port P1, P2 of the first switch.

Furthermore, the ECUs 11 to 14 are connected to each other via a communication bus 79 having a protocol different from that of Ethernet, which may be referred to as a first protocol. In this embodiment, the protocol for communication via the communication bus 79 is CAN, which may be referred to as a second protocol. That is, the communication bus 79 is a CAN bus. CAN is an abbreviation for "Controller Area Network". CAN is a registered trademark.

The microcomputers 61 to 64 of the ECUs 11 to 14 can communicate with each other via the communication bus 79. Each of the microcomputers 61 to 64 functions as a communication processing module 81 that exchanges data with other ECUs via the communication bus 79. The communication processing module 81 transmits at least state data representing the state of the ECU including the microcomputer to the communication bus 79, and receives a state data transmitted from other ECUs via the communication bus 79.

The transmission of the state data is performed, for example, every fixed time Ts. The state data represents at least whether or not the ECU is operating normally. The state data represents that the state data represents that the ECU is operating normally in response to at least that the switch of the ECU is under non-resetting (i.e., is not under resetting). The state data represents that the state data represents that the ECU is not operating normally in response to at least that the switch of the ECU is under resetting. In the ECUs 11 to 14, the switches 51 to 54 are reset and released by the microcomputers 61 to 64, for example. Further, the communication frame including the state data (that is, the CAN frame) includes transmission source information that can identify the transmission source ECU. The transmission source information may be an ID of a switch provided in the transmission source ECU, or may be another ID associated with the switch ID, for example.

[2. Detection of Reception Interruption]

In order to detect reception interruption between the switches, any one of the switches 51 to 54 functions as a master switch, and the other switches function as slave switches. The reception interruption referred to here means that the frame from the adjacent switch is interrupted. Here, it is assumed that the switch 51 is a master switch. An abnormality detection frame and an abnormality notification frame, which will be described later, are frames that are transferred between the ring ports P1 and P2 of the switches 51 to 54. In other words, an abnormality detection frame and an abnormality notification frame each are a frame that flows through a ring-shaped communication path.

As functions for detecting reception interruption, the communication control circuit 73 of the switch 51 includes the following functions <1> to <3>, and the communication control circuit 73 of the switches 52 to 54 includes the following functions <4> to <7>.

<1> The switch 51 serving as a master switch transmits an abnormality detection frame from one of the ring ports P1 and P2 every fixed time Ti. Here, it is assumed that an abnormality detection frame is transmitted from the port P1. The abnormality detection frame is, for example, a frame whose destination MAC address is a code indicating an abnormality detection frame. Note that the abnormality detection frame transmitted from the port P1 of the switch 51 circulates one round of the ring-shaped communication path to eventually return to the port P2 of the switch 51 by the other switches 52 to 54 performing the process <4> described later. In addition, the fixed time Ti that is the transmission interval of the abnormality detection frame is longer than the time during which the abnormality detection frame circulates one round of the ring-shaped communication path. Further, the fixed time Ti is shorter than, for example, the fixed time Ts, which is the state data transmission interval described above.

<2> The switch 51 serving as a master switch determines whether to receive either the abnormality detection frame or the abnormality notification frame transmitted from another switch via the port P2 within the fixed time T1 from the transmission of the abnormality detection frame. If neither the abnormality detection frame nor the abnormality notification frame is received within the fixed time T1, the following process <3> is performed.

The fixed time T1 is longer than the time required for the abnormality detection frame to circulate one round of the ring-shaped communication path and return to the switch 51. In the switch 51, the fixed time T1 from the time of transmission of the abnormality detection frame corresponds to the time during which an abnormality detection frame or an abnormality notification frame should be transmitted from a switch (hereinafter referred to as a previous switch) immediately upstream of (i.e., immediately before) the switch 51 in the circulation direction of the abnormality detection frame.

<3> The switch 51 serving as a master switch identifies, from the switch ID table 77 of the switch 51, the switch that is connected first when viewed from the port P2 (that is, the previous switch). The switch is specified by the switch ID. Then, the switch 51 determines that the reception interruption from the specified previous switch (that is, the switch 54) has occurred. Note that the reception interruption from the previous switch means that a frame that should have been transmitted from the previous switch is not received. In this case, there is a possibility that an abnormality such as disconnection has occurred in the network between the switch 51 and the switch 54 (that is, the communication line 34).

<4> Each of the switches 52 to 54 serving as a slave switch transmits the received abnormality detection frame from different one of the port P1 and the port P2 (downstream ring port) in response to receiving an abnormality detection frame from one of the port P1 and the port P2 (upstream ring port).

<5> Each of the switches 52 to 54 serving as a slave switch determines whether either the abnormality detection frame or the abnormality notification frame transmitted by another switch is received from the upstream ring port of the ports P1 and P2 within a predetermined time T2 from the reception of the abnormality detection frame. Of the switches 52 to 54, a switch is determined to receive neither the abnormality detection frame nor the abnormality notification frame within a predetermined time T2 from the time of reception of the abnormality detection frame (hereinafter referred to as an interruption determined switch). Such a switch performs the following process <6>.

The predetermined time T2 is longer than the fixed time Ti that is the transmission interval of the abnormality detection frame. In the switches 52 to 54, the predetermined time T2 from the reception of the abnormality detection frame corresponds to the time during which the abnormality detection frame or abnormality notification frame should be transmitted from the previous switch.

<6> The interruption determined switch among the switches 52 to 54 identifies the switch that is connected first when viewed from the upstream ring port (that is, the previous switch) from the switch ID table 77 of the switch, and determines that reception interruption from the specified previous switch has occurred. Further, the interruption determined switch transmits an abnormality notification frame from the port P1 or the port P2 whichever is the downstream ring port that is different from the upstream ring port. In this case, there is a possibility that an abnormality such as disconnection has occurred in the network between the interruption determined switch and the previous switch. The abnormality notification frame is, for example, a frame whose destination MAC address is a code indicating an abnormality notification frame. Further, the abnormality notification frame may include the ID of the transmission source switch (that is, the interruption determined switch).

<7> When receiving an abnormality notification frame transmitted from another switch from one of the port P1 and the port P2, each of the switches 52 to 54 transmits the received abnormality notification frame to other one (i.e., different one) of the port P1 and the port P2.

Figure 2:
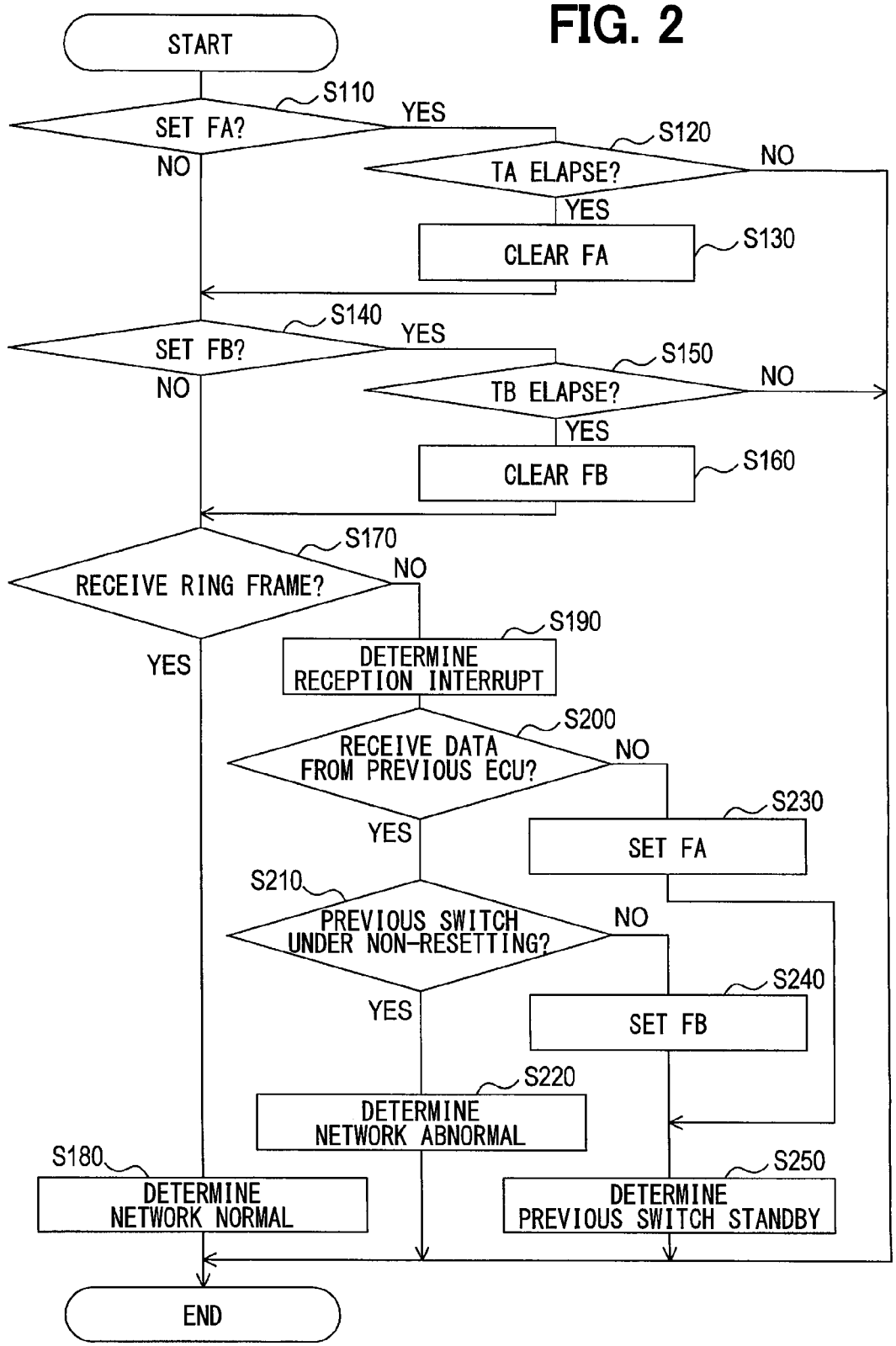
FIG. 2 is a flowchart showing an abnormality detection process.
Figure 3:
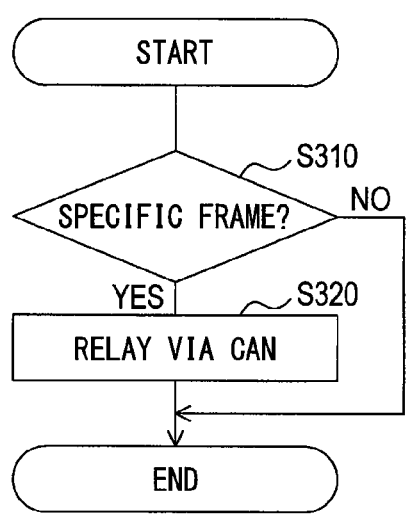
FIG. 3 is a flowchart showing a redundant relay process.
Figure 4:
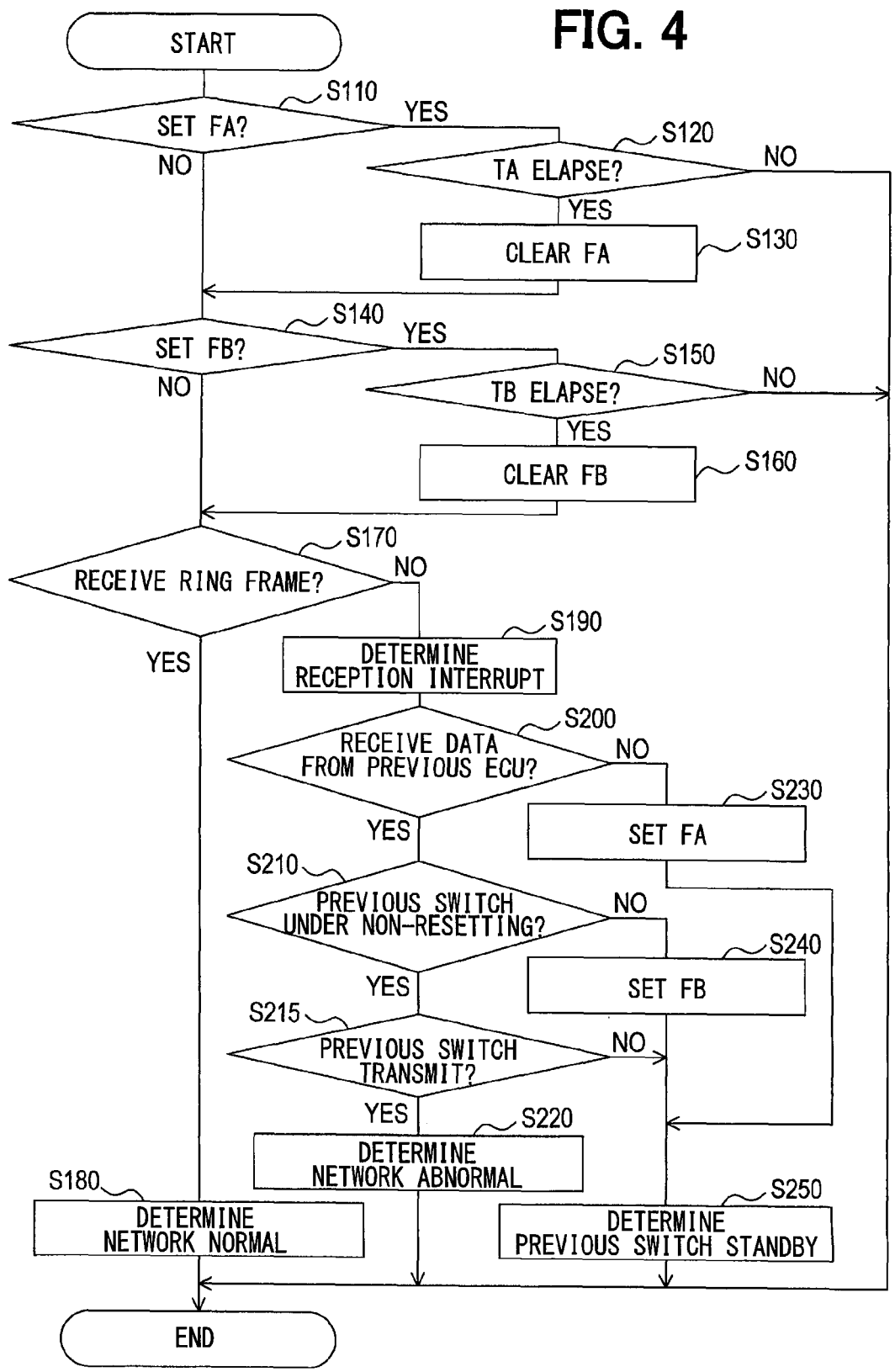
FIG. 4 is a flowchart showing an abnormality detection process according to another embodiment.

The following will describe processes in the flowcharts in FIGS. 2 to 4 executed by the first controller serving as the communication control circuit 73 and the second controller serving as the computation circuit or each microcomputer 61 to 64. Each flowchart includes steps (e.g., S110); one or several steps may be executed by a corresponding module (i.e., section) included in the first controller or the second controller.

[3. Process to Detect Network Errors]

An abnormality detection process performed by the switches 51 to 54 (i.e., the communication control circuit 73 as the first controller) to detect an abnormality in the network will be described with reference to FIG. 2. Further, the abnormality detection target network is a communication line connecting the switches. The abnormality detection frame and the abnormality notification frame described above are frames that flow through a ring-shaped communication path, and are therefore collectively referred to as a ring frame. Here, the process performed by the switch 51 will be described, and the process performed by the other switches 52 to 54 will be described as appropriate with respect to differences from the switch 51.

For example, the switch 51 starts the abnormality detection process of FIG. 2 every time the predetermined time T1 elapses from the transmission of the abnormality detection frame. As shown in FIG. 2, when the abnormality detection process is started, the switch 51 determines whether or not the flag FA is set in S110. If the flag FA is set, the process proceeds to S120. The flag FA is set in S230 described later.

In S120, the switch 51 determines whether or not the predetermined time TA has elapsed since the flag FA was set. If the predetermined time TA has not elapsed, the switch 51 ends the abnormality detection process. If the predetermined time TA has elapsed since the flag FA was set, the switch 51 clears the flag FA in S130, and then proceeds to S140. The switch 51 also proceeds to S140 when it is determined in S110 that the flag FA is not set. Note that the predetermined time TA is, for example, set to a time that is equal to or greater than the maximum value of the difference in activation time between the ECU(that is, the ECU 11) including the switch 51 and the ECU(hereinafter referred to as the previous ECU) including the previous switch.

In S140, the switch 51 determines whether or not the flag FB is set. If the flag FB is set, the switch 51 proceeds to S150. The flag FB is set in S240 described later.

In S150, the switch 51 determines whether or not the predetermined time TB has elapsed since the flag FB was set. If the predetermined time TB has not elapsed, the switch 51 ends the abnormality detection process. If the predetermined time TB has elapsed since the flag FB was set, the switch 51 clears the flag FB in S160, and then proceeds to S170. The switch 51 also proceeds to S170 when it is determined in S140 that the flag FB is not set. For example, the predetermined time TB is set to a time that is equal to or greater than the maximum value of the time for the microcomputer to reset the switch in the previous ECU.

In S170, the switch 51 determines whether or not a ring frame has been received from the previous switch within a predetermined period. The predetermined period referred to here in the switch 51 is a period from when the abnormality detection frame is transmitted to when the predetermined time T1 elapses.

If the switch 51 determines that the ring frame from the previous switch has been received within the predetermined period, the process proceeds to S180, and determines that the network between the switch 51 and the previous switch (i.e., the switch 54) is normal. Specifically, for example, information indicating that the corresponding network is normal is stored in a predetermined storage area. Then, the abnormality detection process ends.

If the switch 51 determines in S170 that the ring frame from the previous switch has not been received within the predetermined period, the switch 51 proceeds to S190 and determines that a reception interruption from the previous switch has occurred.

Then, in the next S200, the switch 51 determines whether the state data from the previous ECU is received by the communication processing module 81 (that is, the microcomputer 61) during the period from the time before the predetermined time Ts to the current time. Further, for example, in S200, the switch 51 may determine whether or not the state data from the previous ECU has been received within a fixed time Ts from the current time.

If the switch 51 determines in S200 that the state data from the previous ECU has been received, the switch 51 proceeds to S210. In S210, based on the content of the state data from the previous ECU, it is determined whether or not the previous ECU is operating normally. In this embodiment, the switch 51 determines whether or not the previous switch is under non-resetting (that is, under operation) as whether or not the previous ECU is operating normally.

If the switch 51 determines in S210 that the previous switch is under non-resetting, that is, if it is determined that the previous ECU is operating normally, the switch 51 proceeds to S220. In S220, it is determined that an abnormality has occurred in the network between the switch 51 and the previous switch. Thereafter, the switch 51 ends the abnormality detection process.

If the switch 51 determines in S200 that the state data from the previous ECU has not been received within the predetermined time Ts, the switch 51 proceeds to S230. In S230, it is determined that the previous ECU is not activated, and the flag FA is set. Then, the switch 51 proceeds to S250, in which it is determined that the previous switch is in a standby state, the abnormality detection process is ended.

If the switch 51 determines in S210 that the previous switch is under resetting, the switch 51 proceeds to S240 and sets the flag FB. Then, the switch 51 proceeds to S250, where it is determined that the previous switch is in a standby state. The abnormality detection process is then ended.

Note that the switches 52 to 54 other than the switch 51 start the abnormality detection process in FIG. 2, for example, each time the above-described predetermined time T2 has elapsed since the reception of the abnormality detection frame. In S170, the switches 52 to 54 also determine whether or not a ring frame from the previous switch has been received within a predetermined period. This predetermined period is a period from the time of reception of the abnormality detection frame to when the predetermined time T2 elapses. Further, the abnormality detection process of FIG. 2 may be performed with fixed time intervals.

[4. Other Processes]

[4-1. Abnormal Location Notification Function]

When each switch 51 to 54 determines in S220 of FIG. 2 that an abnormality has occurred in the network between the switch and the previous switch, that is, when an abnormal location of the network is detected, the other switch or other ECU may be notified.

For example, in the case of the switch 51, an abnormal location notification frame including abnormal location information that can identify an abnormal location may be transmitted from the port that should transmit the abnormality detection frame out of the ports P1 and P2. For example, the abnormal location information may be an ID of the switch. In the case of the switches 52 to 54, the abnormal location notification frame may be transmitted from the port P1, P2 which is not the upstream ring port. When each of the switches 51 to 54 receives the abnormal location notification frame transmitted from another switch from either of the ports P1 and P2, it may identify the abnormal location from the abnormal location information included in the abnormal location notification frame. Furthermore, the abnormal location notification frame may be transmitted from one of the ports P1 and P2 that is different from the receiving one. In this way, the abnormal location notification frame is transmitted to all the switches 51 to 54. Of the switches 51 to 54, switches other than the transmission source of the abnormal location notification frame can detect that there is an abnormality in the network between (i) a switch indicated by the ID as the abnormal location information included in the received abnormal location notification frame and (ii) the previous switch viewed from the switch.

Further, the abnormality notification frame may also be used as the abnormality location notification frame. Further, for example, an abnormal location detected by any of the switches 51 to 54 in S220 of FIG. 2 is transmitted from the microcomputer in the ECU having the switch detecting the abnormal location to the microcomputers in other ECUs via the communication bus 79, to allow the other switches to be informed.

[4-2. Detour Route Selection Function]

Each of the switches 51 to 54 may have connection relation specifying information, which can specify a relation between the ECUs and the ports P3 and P4 to which the respective ECUs are connected. Then, each of the switches 51 to 54 detects the abnormal location, and then receives, from the port P3 or P4 of the switch, the frames that may include a frame (hereinafter referred to as a relay target frame) whose destination is the ECU connected to the port P3, or P4 of the other switch. When relaying such a relay target frame, the following process may be performed. In addition, "after detecting the abnormal location" said here corresponds to either "after detecting the abnormal location of the network in S220 of FIG. 2", or "after detecting the abnormal location of the network by the abnormal location information from other switch".

Each of the switches 51 to 54 identifies a switch (hereinafter referred to as a destination switch) connected to the port P3 or P4 of the destination ECU of the relay target frame, from the connection relation specifying information. Then, of the ring ports P1 and P2 of the switch, the one that can transmit the frame to the destination switch without passing through the detected abnormal location is selected, and the relay target frame is transmitted from the selected ring port. In this way, with respect to the transfer of the relay target frame, the communication path that avoids the abnormal location is selected as the detour route among the two communication paths connected to the ports P1 and P2.

Each of the switches 51 to 54 may transmit the relay target frame from both ports P1 and P2 after detecting the abnormal location. Transmitting the relay target frame by selecting a detour route that avoids the abnormal location can suppress the traffic.

[4-3. Redundant Relay Function]

The respective microcomputers 61 to 64 (each serving as the computation circuit or the second controller) of the ECUs 11 to 14 may perform the process shown in FIG. 3 after the switch of the ECU detects the abnormal location of the network. Here, the description will be made on the assumption that the microcomputer 61 of the ECU 11 performs the process shown in FIG. 3 as an example. Naturally, each of the other microcomputers 62 to 64 can perform the process in FIG. 3 equivalently.

The microcomputer 61 performs a process shown in FIG. 3 when the switch 51 receives the above-described relay target frame from either of the ports P3 and P4 after the switch 51 detects an abnormal location. As shown in FIG. 3, in S310, the microcomputer 61 determines whether or not the relay target frame received by the switch 51 is a predetermined specific frame. Then, if the relay target frame is not a specific frame, the process of FIG. 3 ends. If the relay target frame is a specific frame, the process proceeds to S320. The specific frame may be, for example, a frame destined for a specific ECU or a frame including a specific type of data.

In S320, the microcomputer 61 performs a process of relaying the relay target frame, which is a specific frame, using the CAN communication bus 79, and then ends the process of FIG. 3. For example, in S320, the relay target frame may be stored in the data area of the CAN frame, and this CAN frame may be transmitted to the communication bus 79.

In response to receiving a CAN frame, which stores a relay target frame and is transmitted by another microcomputer to the communication bus 79, the respective microcomputers 61 to 64 of the ECUs 11 to 14 may perform the following process.

For instance, the microcomputer 61 performs a destination determination based on the destination MAC address in a relay target frame stored in a received CAN frame. Specifically, the microcomputer 61 performs a destination determination that determines whether or not the destination device of the relay target frame is an ECU connected to the port P3 or P4 of the switch 51 in the ECU 11. If the destination determination is made affirmatively, the microcomputer 61 outputs the relay target frame stored in the CAN frame to the switch 51 in the ECU 11. In addition, in response to that the relay target frame is outputted from the microcomputer 61 to the switch 51, the switch 51 may transfer, to the destination device, either the outputted relay target frame or the relay target frame received from any other switch 52 to 54 via any of the communication lines 31 and 34.

The relay target frame that is a specific frame may be divided into a plurality of parts, and the divided frames may be stored individually in a plurality of CAN frames and transmitted. In this case, if the microcomputer 61 makes the destination determination affirmatively, the microcomputer 61 restores the relay target frame that is divided into a plurality of CAN frames and outputs the restored relay target frame to the switch 51 in the ECU 11.

[5. Effects]

According to the embodiment detailed above, the following effects (1) to (7) are obtained. In the above embodiment, the ring frame corresponds to a predetermined frame, and each of the ECUs 11 to 14 corresponds to an electronic control unit. For example, if the ECU 11 is the electronic control unit, the switch 51 corresponds to a relay device. The ECU 14 which is the previous ECU of the ECU 11 corresponds to a different electronic control unit; the switch 54 corresponds to a different relay device. The communication line 34 between the ECU 11 and the previous ECU 14 corresponds to a first network; the communication bus 79 corresponds to a second network. Further, the communication control circuit 73 of each of the switches 51 to 54 functions as an interruption determination module or section, an abnormality determination module or section, a reset release waiting module or section, and an activation waiting module or section. S170, S190 in FIG. 2 correspond to processing as an interruption determination module or section. S200 to S220 in FIG. 2 correspond to processing as an abnormality determination module or section. S140 to S160 and S240 in FIG. 2 correspond to processing as a reset release waiting module or section. S110 to S130 and S230 in FIG. 2 correspond to processing as a start waiting module or section. The microcomputers 61 to 64 also each function as a redundant relay module or section. Further, S310, S320 in FIG. 3 correspond to processing as a redundant relay module or section.

(1) The respective switches 51 to 54 in the ECUs 11 to 14 determine in S190 of FIG. 2 that the reception from the previous switch has been interrupted. Upon determining in S190, it is determined whether or not an abnormality has occurred in the network connected with the previous switch by determining in S200 and S210 in FIG. 2. For this reason, it is determined whether an abnormality has occurred in the network connected with the previous switch not only based on the event of reception interruption, but also based on at least one of (i) the presence/absence of the state data from the previous ECU via a different network (i.e., communication bus 79) within a fixed time and (ii) the content of the received state data. Therefore, whether or not an abnormality has occurred in the network connected with the previous switch is determined in consideration of the state of the previous ECU. As a result, it is possible to improve the accuracy of the abnormality determination for the network (that is, the communication lines 31 to 34) to which the switches 51 to 54 are connected.

(2) The respective switches 51 to 54 determine in S210 of FIG. 2 whether or not the previous ECU is operating normally based on the content of the state data from the previous ECU. When it is determined that the previous ECU is operating normally, it is determined that an abnormality has occurred in the network connected with the previous switch. Such a configuration can prevent erroneous determination that an abnormality has occurred in the network connected with the previous switch only based on the event of the reception interruption from the previous switch under the case where the switch of the previous ECU (that is, the previous switch) is unable to transmit a frame under the previous ECU being not operating normally.

(3) The respective switches 51 to 54 determine in S210 of FIG. 2 whether or not the previous switch is under non-resetting based on the content of the state data from the previous ECU, for determining whether or not the previous ECU is operating normally. When it is determined that the previous switch is under non-resetting, that is, not under resetting, it is determined that an abnormality has occurred in the network connected with the previous switch. Such a configuration can prevent an erroneous determination that an abnormality has occurred in the network connected with the previous switch only by an event of reception interruption under the case where no frame can be transmitted under the previous switch being under resetting.

(4) The respective switches 51 to 54 determine In S200 of FIG. 2 whether or not the state data from the previous ECU has been received within a predetermined time Ts that is the state data communication interval. If the state data from the previous ECU is not received within the predetermined time Ts, it is not determined that an abnormality has occurred in the network connected with the previous switch. Such a configuration can prevent an erroneous determination that an abnormality has occurred in the network with the previous switch only by the event of reception interruption under the case where the previous switch cannot transmit a frame under the previous ECU not being activated due to variations in the startup time between the ECUs 11 to 14.

(5) The respective switches 51 to 54 sets the flag FB in response to determining both (i) that the reception interruption from the previous switch has occurred in S190 of FIGS. 2 and (ii) that the previous switch is under resetting in S210 of FIG. 2. Then, by setting the flag FB, at least the determination in S170 of FIG. 2 is stopped until the aforementioned predetermined time TB has elapsed. Such a configuration can suppress at least the determination of S170 of FIG. 2 from being wasted, and reduce the processing load during the resetting of the previous switch.

(6) The respective switches 51 to 54 determine both (i) that the reception interruption from the previous switch has occurred in S190 of FIGS. 2, and (ii) that the state data from the previous ECU has not been received within the predetermined time Ts in S200 of FIG. 2. Upon determining both, it is determined that the previous ECU is not activated, and the flag FA is set. Then, by setting the flag FA, at least the determination in S170 of FIG. 2 is stopped until the predetermined time TA has elapsed. Such a configuration can prevent at least the determination of S170 in FIG. 2 from being performed wastefully, and reduce the processing load under the state where the previous switch cannot transmit a frame under the previous ECU being not activated.

(7) The respective microcomputers 61 to 64 of the ECUs 11 to 14 perform the processing shown in FIG. 3 after the switch of the ECU detects the abnormal location of the network, thereby specifying a specific frame in the frame relayed by the switch of the ECU. The frame is relayed using the communication bus 79. Such a configuration can therefore relay a specific frame not only through the normal communication paths of the two Ethernet communication paths but also through the communication bus 79. Therefore, it is possible to increase the possibility that a specific frame is transferred to the destination device.

[6. Other Embodiments]

While the embodiment of the present disclosure has been described, the present disclosure is not limited to the embodiment described above and can be modified in various manners.

For example, S200 or S210 in FIG. 2 may be deleted. Further, a processing unit provided separately from the switches 51 to 54 may perform the processing of FIG. 2. Further, for example, the state data transmitted from the ECUs 11 to 14 onto the communication bus 79 may be data representing at least whether or not the switch of the ECU has transmitted a ring frame.

For example, in the above embodiment, it is assumed that the state data is data representing the contents of whether or not the switch is under resetting and whether or not the switch has transmitted a ring frame. In this case, the abnormality detection process of FIG. 2 may be as shown in FIG. 4. Compared with the abnormality detection process of FIG. 2, the abnormality detection process of FIG. 4 has S215 added between S210 and S220. Then, as shown in FIG. 4, when the respective switches 51 to 54 determine in S210 that the previous switch is under non-resetting (that is, under operating), it is determined in S215 whether or not the previous switch has transmitted a ring frame based on the content of the state data from the previous ECU. If the previous switch has transmitted a ring frame, the process proceeds to S220. If the previous switch has not transmitted a ring frame, the process proceeds to S250.

According to such an embodiment, each of the switches 51 to 54 can know whether or not the previous switch has transmitted a ring frame via the communication bus 79 different from the network between the switches 51 to 54. For this reason, the respective switches 51 to 54 can suppress an erroneous determination that the network connected with the previous switch is abnormal due to the interruption of reception from the previous switch under the case where the previous switch cannot transmit the ring frame for some reason.

Further, the content represented by the state data transmitted from the respective ECUs 11 to 14 may be configured not to include the content indicating whether or not the switch is under resetting. In this case, S140 to S160, S210, and S240 in FIG. 4 can be deleted.

Further, the number of ECUs including switches may be other than 4, such as 2 or 3, for example.

In addition, the ECUs 11 to 14 and the method thereof described in the present disclosure may be each implemented by at least one special purpose computer created by configuring a memory and a processor programmed to execute one or more particular functions embodied in computer programs. Alternatively, the ECUs 11 to 14 and the method thereof described in the present disclosure may be each implemented by at least one special purpose computer created by configuring a processor provided by one or more special purpose hardware logic circuits. Further alternatively, the ECUs 11 to 14 and the method thereof described in the present disclosure may be each implemented by at least one special purpose computer created by configuring a combination of (i) a memory and a processor programmed to execute one or more particular functions and (ii) a processor provided by one or more hardware logic circuits. That is, the ECUs 11 to 14 and the method thereof described in the present disclosure may be each implemented by at least one special purpose computer created by configuring (i) a memory and a processor programmed to execute one or more particular functions embodied in computer programs, or (ii) a processor provided by one or more special purpose hardware logic circuits, or (iii) a combination of (a) a memory and a processor programmed to execute one or more particular functions and (b) a processor provided by one or more hardware logic circuits.

The computer program may be stored in a computer-readable non-transitory tangible storage medium as instructions executed by the computer. A method of realizing the functions of the modules or sections included in the ECU 11 to 14 are not necessarily required to include software, all functions may be implemented using one or more hardware circuits.

Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. Alternatively, a part of the configuration of the above embodiment may be omitted. At least a part of the configuration of the above embodiment may be added to or replaced with another configuration of another embodiment.

The present disclosure may be realized in various forms in addition to the ECUs 11 to 14 described above, such as a system including the ECUs 11 to 14 as components, a program for causing a computer to function as the ECUs 11 to 14, a non-transitory tangible storage medium such as semiconductor memory in which the program is stored, or a network abnormality detection method.

For reference to further explain features of the present disclosure, the description is added as follows.

As explained above, there is known a configuration which connects, in a ring-shaped communication path, switches serving as relay devices provided respectively in a plurality of ECUs.

The switch of each ECU in the above configuration periodically circulates either an abnormality detection frame or an abnormality notification frame in one direction (i.e., a frame circulation direction) in the ring-shaped communication path. Suppose a case where the switch of each ECU does not receive either the abnormality detection frame or the abnormality notification frame within a predetermined period. In such a case, it is determined that an abnormality has occurred in the communication path located immediately upstream of the switch in the frame circulation direction of the communication path (that is, network) between the switches. In other words, suppose a case where a switch fails to receive a frame that is supposed to be transmitted from another adjacent switch within a predetermined period. In such a case, the switch determines that an abnormality has occurred in the network connected with the adjacent switch.

As the result of detailed studies, the Inventor has found that the above technology detecting an abnormality in the network may however pose some issues. For instance, depending on the state of the ECU, the switch may not be able to transmit a frame used to detect a network abnormality. If a switch of ECU cannot transmit a frame, an adjacent downstream switch connecting with the switch may erroneously determine that a network abnormality has occurred.

It is thus desired to provide a technique for improving an accuracy of determining an abnormality of a network to which relay devices or switches are connected.

An aspect of the present disclosure described herein is set forth in the following clauses.

According to an aspect of the present disclosure, an electronic control unit is provided to include a relay device, an interruption determination module, a communication processing module, and an abnormality determination module.

The relay device is connected via a first network with a different relay device included in a different electronic control unit; the relay device is configured to relay a frame at least via the first network. The interruption determination module, which may be provided by a first controller, is configured to determine whether or not a reception interruption has occurred. The reception interruption signifies that at least one predetermined frame is not received by the relay device within a predetermined time; the predetermined frame is scheduled to be transmitted from the different relay device to the relay device via the first network within the predetermined time. The communication processing module, which may be provided by a second controller, is configured to receive a state data representing a state of the different electronic control unit from a second network different from the first network, the state data periodically being transmitted from the different electronic control unit to the second network. The abnormality determination module, which may be provided by the first controller, is configured to determine, in response to the reception interruption being determined to have occurred by the interrupt determination module, whether an abnormality has occurred in the first network based on at least one of (i) a presence or absence of reception of the state data by the communication processing module within a fixed time, and (ii) a content of the state data received by the communication processing module (i.e., based on based on (i) a presence or absence of reception of the state data by the communication processing module within a fixed time, or (ii) a content of the state data received by the communication processing module, or (iii) both the presence or absence of reception of the state data and the content of the state data).

Note that the first controller and the second controller may be provided as one or more controllers.

In the electronic control unit according to the above aspect, the relay device may be provided as including (i) a plurality of ports that include two ring ports each connected with one of a plurality of communication lines forming a first network being a ring-shaped network. The electronic control unit may further include a bus interface connected with a communication bus different from the plurality of communication lines, the communication bus connecting the plurality of relay devices to each other to form a second network; and (ii) one or more controllers. The one or more controllers may function as the above-described interruption determination module, the communication processing module, and the abnormality determination module.

Further, an individual module in each controller or an individual controller may be configured by (i) a central processing unit (CPU) along with memory storing instructions executed by the CPU or (ii) hardware circuitry with no CPU, or (iii) a combination of the CPU along with memory and the hardware circuitry.

In such a configuration, whether or not an abnormality has occurred in the first network may be determined not only based on the reception interruption that a predetermined frame from a different relay device in a different electronic control unit is not received within a predetermined period, but also based on the state of the different electronic control unit. For this reason, it is possible to improve an accuracy of the abnormality determination for the first network to which the relay device is connected.

What is claimed is:

1. An electronic control unit comprising:
a relay device connected via a first network with a different relay device included in a different electronic control unit, the relay device being configured to relay a frame at least via the first network;
an interruption determination module configured to determine whether or not a reception interruption has occurred, the reception interruption in which at least one predetermined frame is not received by the relay device within a predetermined time, the predetermined frame being scheduled to be transmitted from the different relay device to the relay device via the first network within the predetermined time;
a communication processing module configured to receive a state data representing a state of the different electronic control unit from a second network different from the first network, the state data periodically being transmitted from the different electronic control unit to the second network; and
an abnormality determination module configured to determine, in response to the reception interruption being determined to have occurred by the interrupt determination module, whether an abnormality has occurred in the first network based on (i) a presence or absence of reception of the state data by the communication processing module within a fixed time, or (ii) a content of the state data received by the communication processing module, or (iii) both the presence or absence of reception of the state data and the content of the state data.

2. The electronic control unit according to claim 1, wherein:
the state data is a data representing at least whether or not the different electronic control unit is operating normally; and
the abnormality determination module is configured to determine that an abnormality has occurred in the first network in response to the different electronic control unit being determined to be operating normally based on the state data received by the communication processing module, under the reception interruption being determined to have occurred by the interruption determination module.

3. The electronic control unit according to claim 2, wherein:
the state data represents that the different electronic control unit is operating normally in response to at least that the state data represents that the different relay device is under non-resetting;
the state data represents that the different electronic control unit is not operating normally in response to at least that the state data represents that the different relay device is under resetting; and
the abnormality determination module is configured to determine that an abnormality has occurred in the first network in response to the different relay device being determined to be under non-resetting based on the state data received by the communication processing module, under the reception interruption being determined to have occurred by the interruption determination module.

4. The electronic control unit according to claim 3, further comprising:
a reset release waiting module configured to stop the determining by the interruption determination module for a predetermined time, in response to the different relay device being determined to be under resetting under the reception interruption being determined to have occurred by the interruption determination module.

5. The electronic control unit according to claim 1, wherein
the abnormality determination module is configured not to determine that an abnormality has occurred in the first network in response to the absence of reception of the state data by the communication processing module within the predetermined time, under the reception interruption being determined to have occurred by the interruption determination module.

6. The electronic control unit according to claim 1, further comprising:
a start waiting module configured to stop the determining by the interruption determination module for a predetermined time, in response to the absence of reception of the state data within the predetermined time being determined under the reception interruption being determined to have occurred by the interruption determination module.

7. The electronic control unit according to claim 1, wherein:
the state data is a data representing at least whether or not the different relay device has transmitted the predetermined frame; and
the abnormality determination module is configured to determine that an abnormality has occurred in the first network in response to the different relay device being determined to have transmitted the predetermined frame based on the state data received by the communication processing module, under the reception interruption being determined to have occurred by the interruption determination module.

8. The electronic control unit according to claim 1, further comprising:
a redundant relay module configured to perform, using the second network, a process of relaying a specific frame included in frames relayed by the relay device in response to the abnormality being determined to have occurred in the first network.

9. An electronic control unit comprising:
a relay device connected via a first network with a different relay device included in a different electronic control unit, the relay device being configured to relay a frame at least via the first network; and
one or more processors and/or hardware circuitry configured to
determine whether or not a reception interruption has occurred, the reception interruption in which at least one predetermined frame is not received by the relay device within a predetermined time, the predetermined frame being scheduled to be transmitted from the different relay device to the relay device via the first network within the predetermined time,
receive a state data representing a state of the different electronic control unit from a second network different from the first network, the state data periodically being transmitted from the different electronic control unit to the second network, and
determine, in response to the reception interruption being determined to have occurred, whether an abnormality has occurred in the first network based on (i) a presence or absence of reception of the state data within a fixed time, or (ii) a content of the state data that is received, or (ii) both the presence or absence of reception of the state data and the content of the state data.

10. The electronic control unit according to claim 9, wherein:
the state data is a data representing at least whether or not the different electronic control unit is operating normally; and
the one or more processors and/or hardware circuitry are configured to determine that an abnormality has occurred in the first network in response to the different electronic control unit being determined to be operating normally based on the state data received, under the reception interruption being determined to have occurred.

11. The electronic control unit according to claim 10, wherein:
the state data represents that the different electronic control unit is operating normally in response to at least that the state data represents that the different relay device is under non-resetting;

the state data represents that the different electronic control unit is not operating normally in response to at least that the state data represents that the different relay device is under resetting; and
the one or more processors and/or hardware circuitry are configured to determine that an abnormality has occurred in the first network in response to the different relay device being determined to be under non-resetting based on the state data received, under the reception interruption being determined to have occurred.

12. The electronic control unit according to claim 11, wherein:
the one or more processors and/or hardware circuitry are configured to stop the determining for a predetermined time, in response to the different relay device being determined to be under resetting under the reception interruption being determined to have occurred.

13. The electronic control unit according to claim 9, wherein
the one or more processors and/or hardware circuitry are configured not to determine that an abnormality has occurred in the first network in response to the absence of reception of the state data within the predetermined time, under the reception interruption being determined to have occurred.

14. The electronic control unit according to claim 9, wherein:
the one or more processors and/or hardware circuitry are configured to stop the determining for a predetermined time, in response to the absence of reception of the state data within the predetermined time being determined under the reception interruption being determined to have occurred.

15. The electronic control unit according to claim 9, wherein:
the state data is a data representing at least whether or not the different relay device has transmitted the predetermined frame; and
the one or more processors and/or hardware circuitry are configured to determine that an abnormality has occurred in the first network in response to the different relay device being determined to have transmitted the predetermined frame based on the state data received, under the reception interruption being determined to have occurred.

16. The electronic control unit according to claim 9, wherein:
the one or more processors and/or hardware circuitry are configured to perform, using the second network, a process of relaying a specific frame included in frames relayed by the relay device in response to the abnormality being determined to have occurred in the first network.

* * * * *